(12) United States Patent
Readman

(10) Patent No.: US 6,595,559 B1
(45) Date of Patent: Jul. 22, 2003

(54) PIPE COUPLING

(75) Inventor: Matthew Readman, Manchester (GB)

(73) Assignee: Tricorn Group PLC (GB)

( * ) Notice: Subject to any disclaimer, the term of this patent is extended or adjusted under 35 U.S.C. 154(b) by 0 days.

(21) Appl. No.: 09/869,028

(22) PCT Filed: Dec. 21, 1999

(86) PCT No.: PCT/GB99/04224

§ 371 (c)(1),
(2), (4) Date: Nov. 28, 2001

(87) PCT Pub. No.: WO00/39495

PCT Pub. Date: Jul. 6, 2000

(30) Foreign Application Priority Data

Dec. 24, 1998 (GB) ............................................. 9828423

(51) Int. Cl.⁷ ................................................ F16L 17/10
(52) U.S. Cl. ...................................... 285/382; 285/371
(58) Field of Search .......................... 285/382, 96, 97, 285/371, 106, 15

(56) References Cited

U.S. PATENT DOCUMENTS

| | | | | |
|---|---|---|---|---|
| 2,083,842 A | * | 6/1937 | Henning ..................... 277/605 |
| 3,023,995 A | * | 3/1962 | Hopkins ..................... 192/88 B |
| 3,420,554 A | * | 1/1969 | Straub ......................... 285/104 |
| 3,843,167 A | * | 10/1974 | Gronstedt ................. 174/84 R |
| 3,915,480 A | * | 10/1975 | Kish et al. ................... 277/615 |
| 4,026,584 A | | 5/1977 | Lowe | |
| 4,109,940 A | | 8/1978 | Reneau | |
| 4,371,198 A | * | 2/1983 | Martin ....................... 285/145.1 |
| 4,373,377 A | * | 2/1983 | Smith et al. .................. 285/97 |
| 4,676,531 A | * | 6/1987 | Martin ........................ 285/226 |
| 5,595,405 A | * | 1/1997 | Knutsen .................. 285/382.7 |
| 5,924,743 A | * | 7/1999 | Bonmartin et al. ......... 277/331 |

FOREIGN PATENT DOCUMENTS

| | | |
|---|---|---|
| EP | 0 072 199 A1 | 2/1983 |
| EP | 0 072 199 B1 | 2/1983 |
| GB | 2033037 | 5/1980 |
| WO | 93/21099 | 10/1993 |

* cited by examiner

*Primary Examiner*—Eric K. Nicholson
(74) *Attorney, Agent, or Firm*—Michael Best & Friedrich LLP

(57) ABSTRACT

A coupling comprising a tubular inner member (9) defining a socket dimensioned to receive a pipe to be connected to the coupling. The inner member (9) is positioned within a tubular body (1) to define a closed annular chamber, and an inlet (2) is provided tough the body so as to communicate with the chamber. In use, pressurised fluid such as a setting resin is introduced through the inlet (2) into the chamber. The pressure of the introduced fluid is sufficient to cause the radially inwards deformation of the tubular inner member (9) so as to grip the pipe (13, 14) which is received within the socket. Pressure may be applied up to a predetermined limit, or until seal failure.

33 Claims, 18 Drawing Sheets

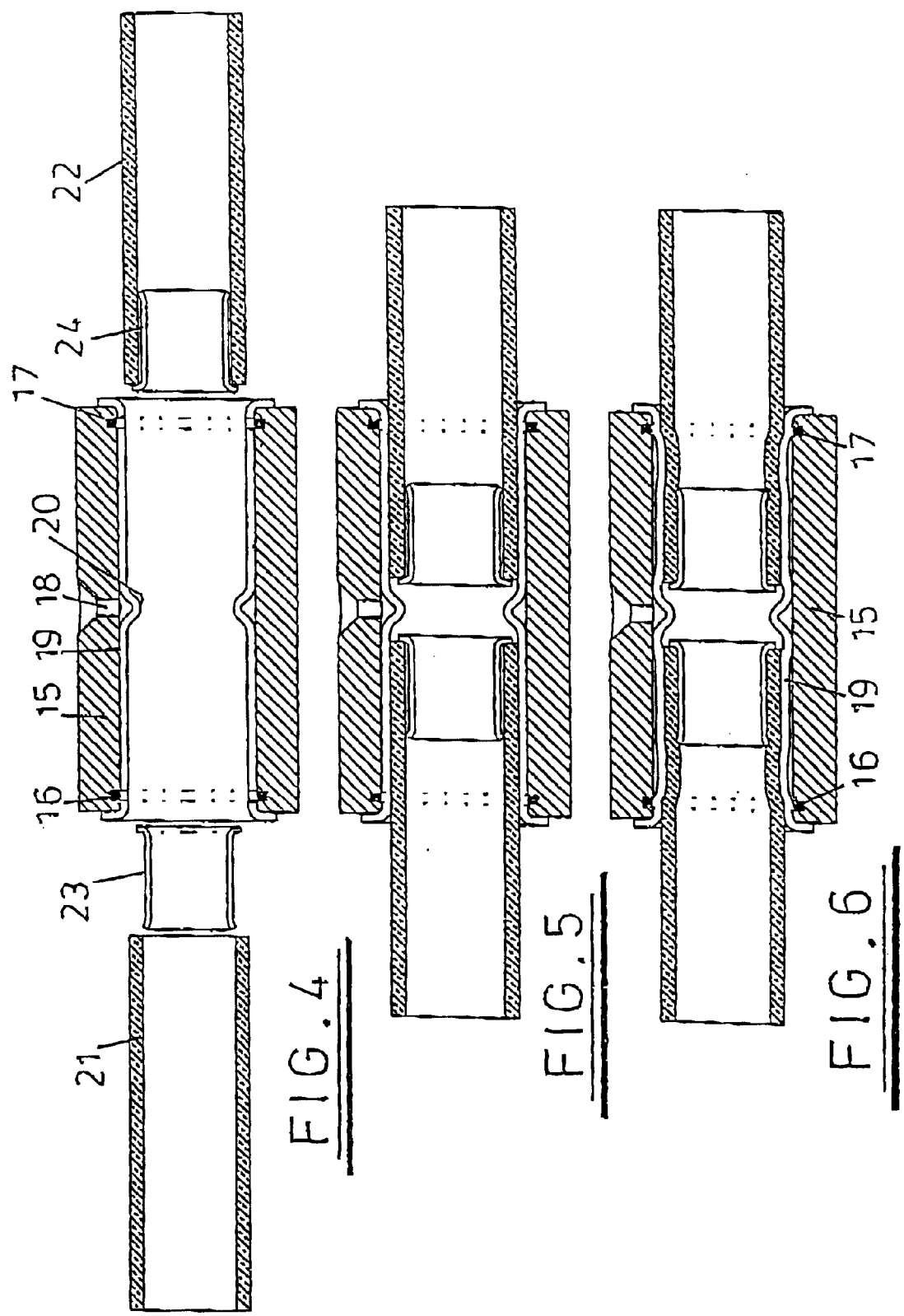

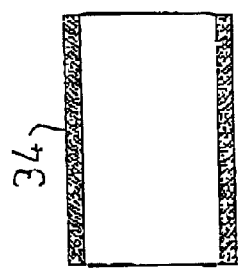
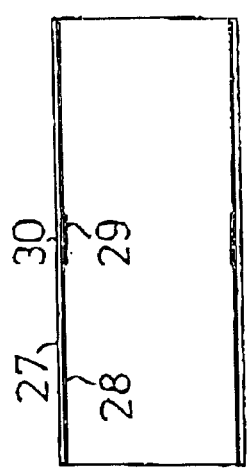
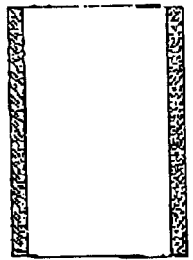
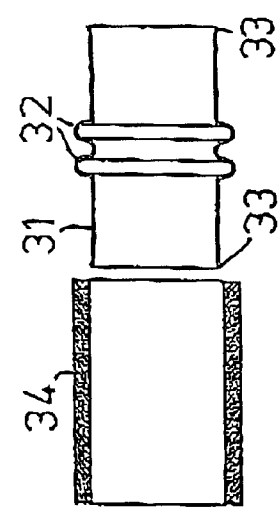
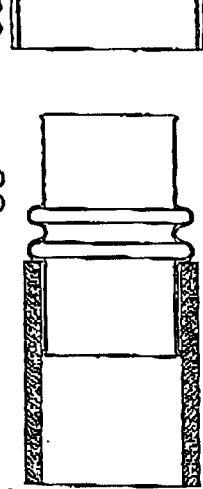
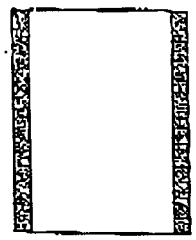
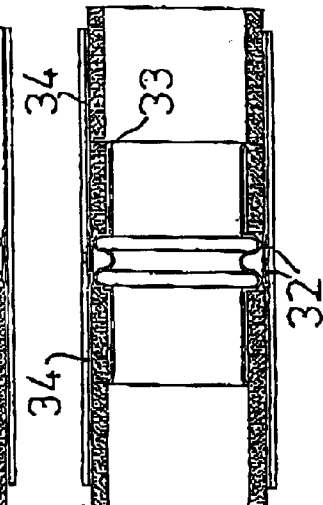
FIG.10  FIG.11  FIG.12  FIG.13

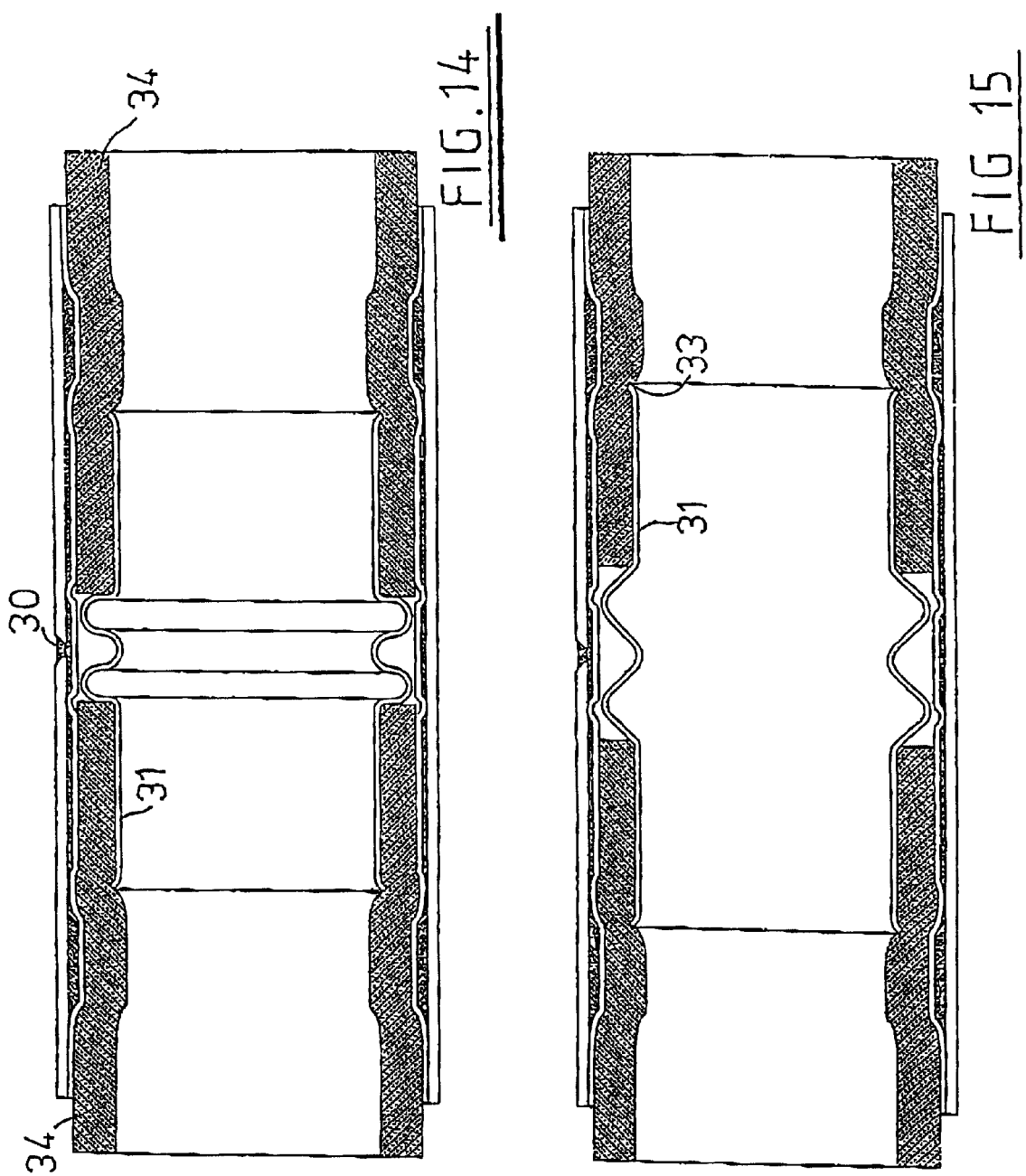

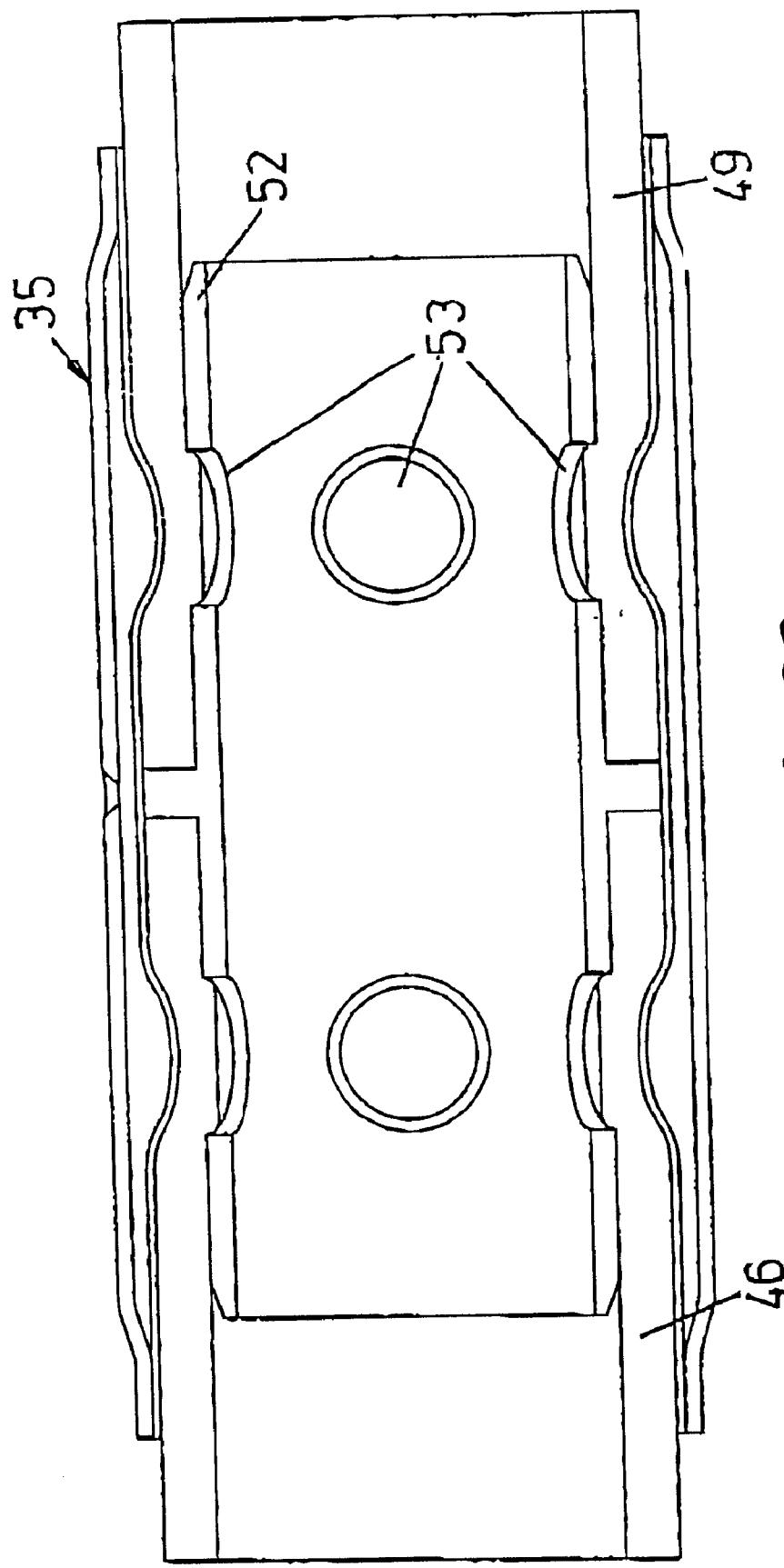

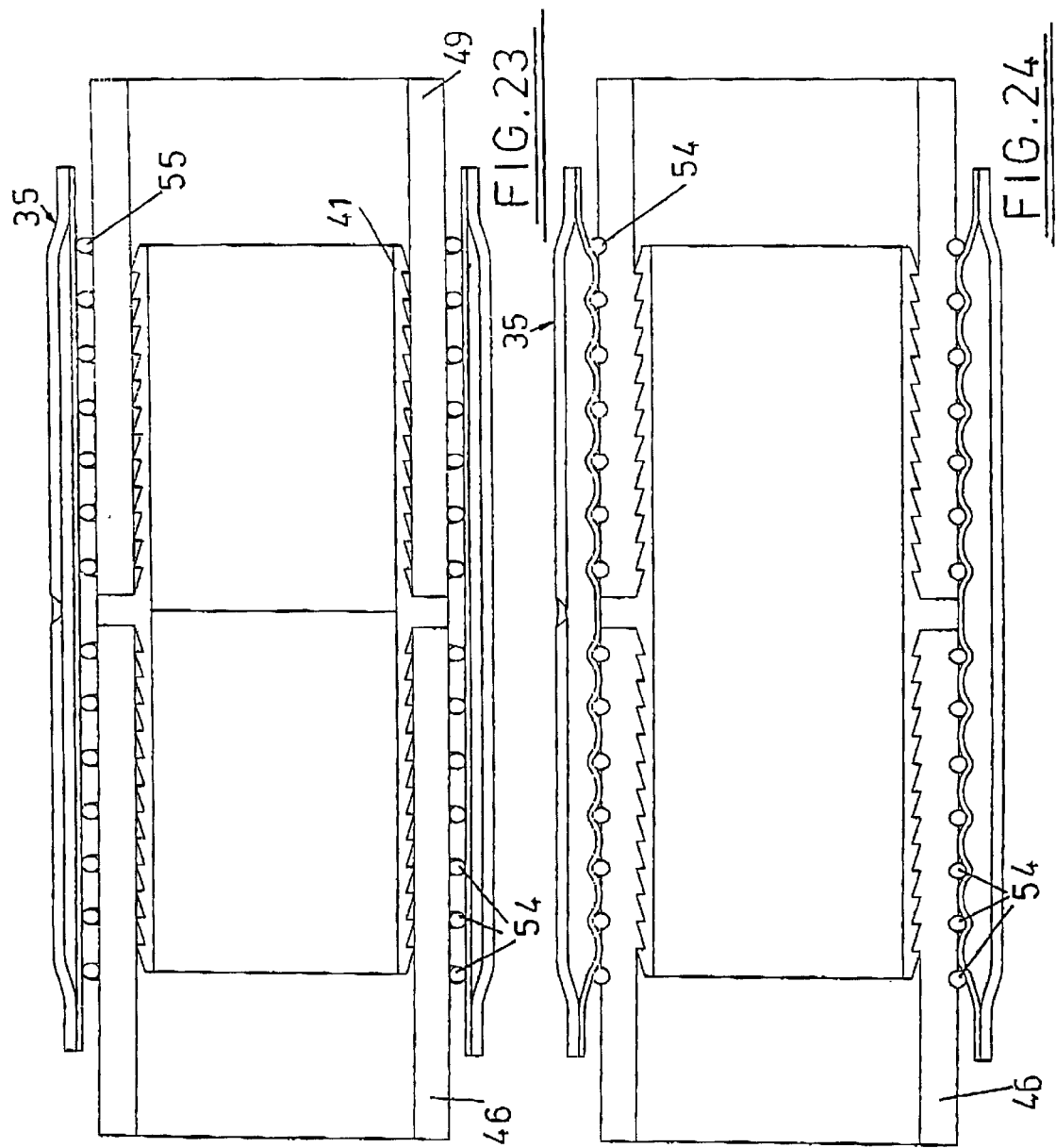

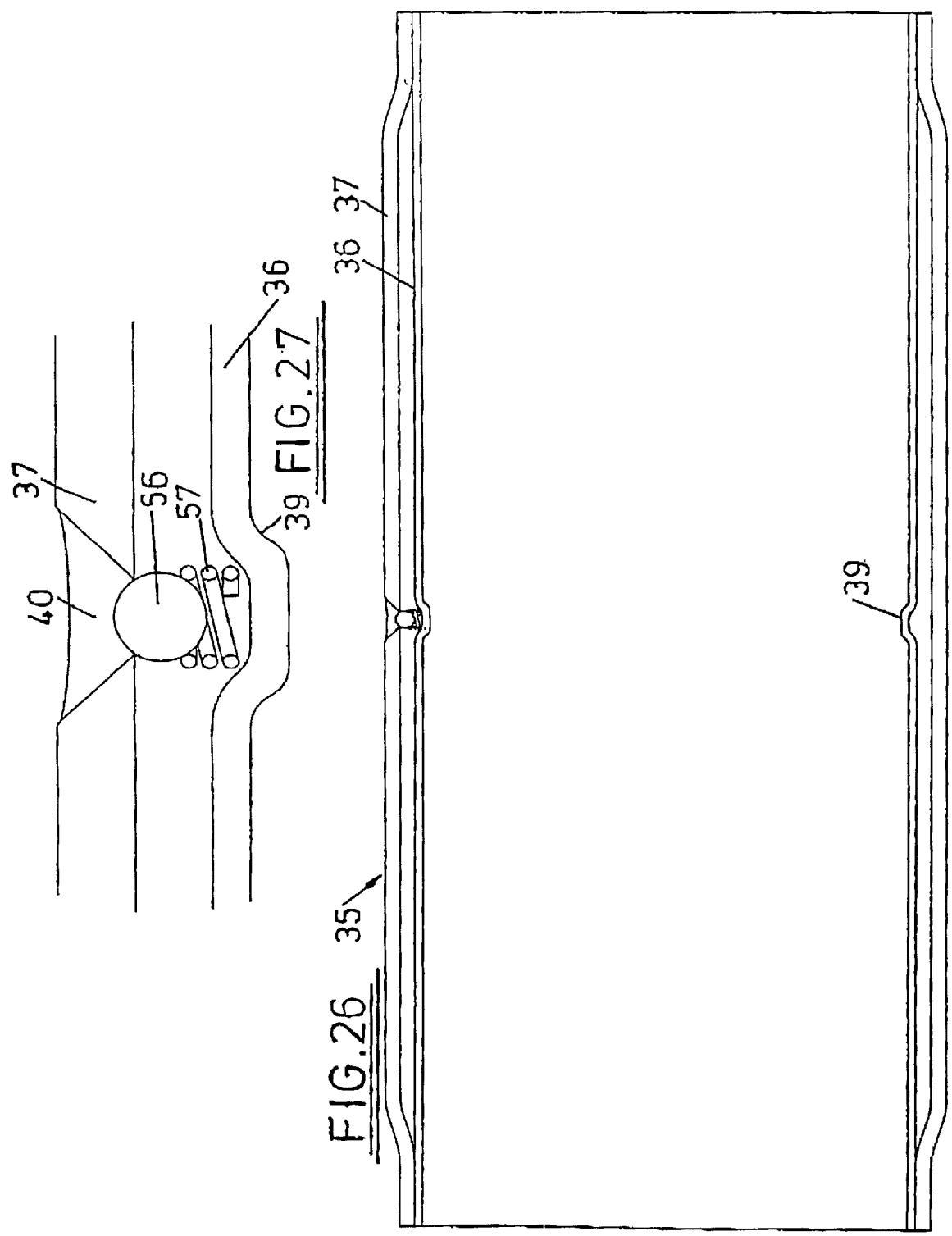

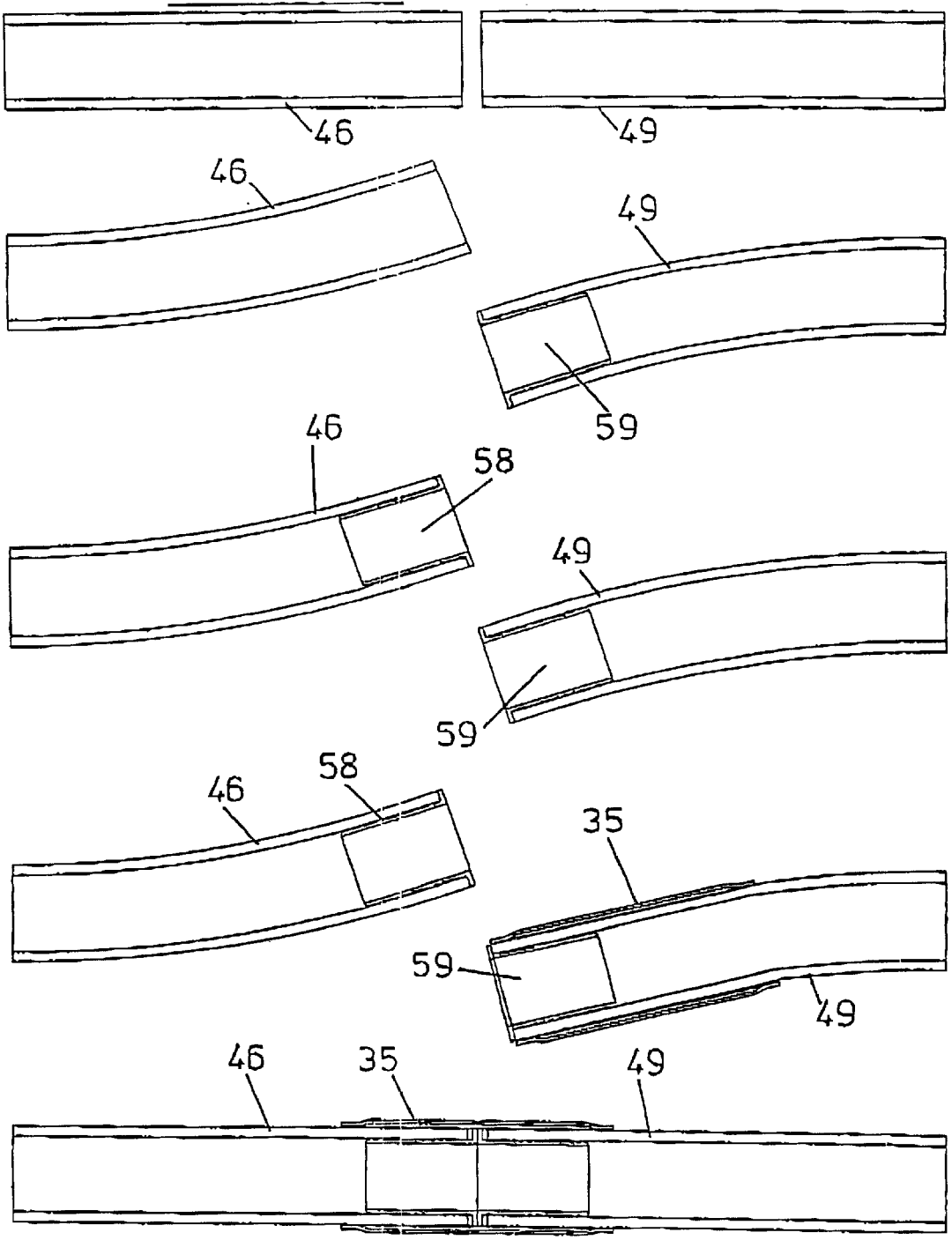

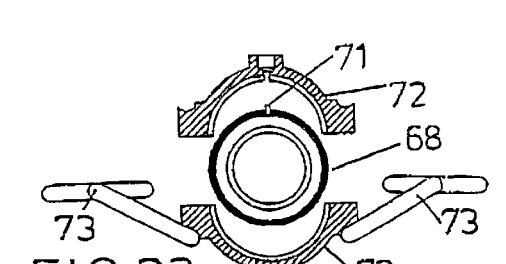
FIG.32
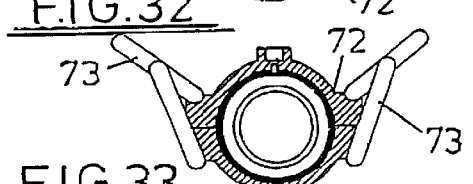
FIG.33
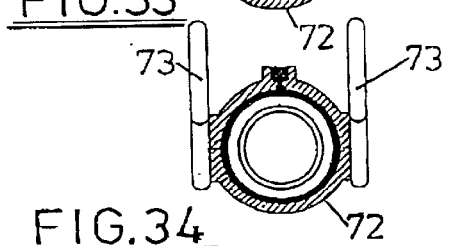
FIG.34
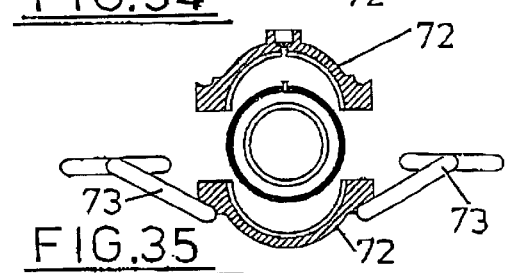
FIG.35
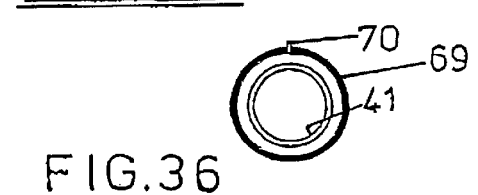
FIG.36
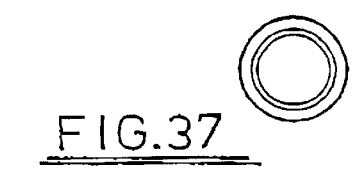
FIG.37
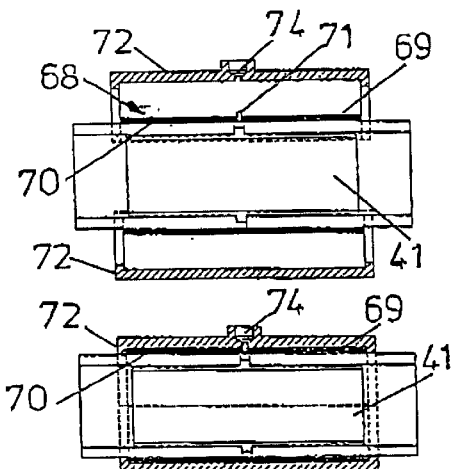
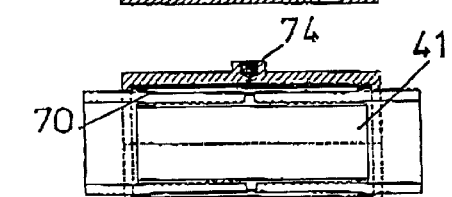
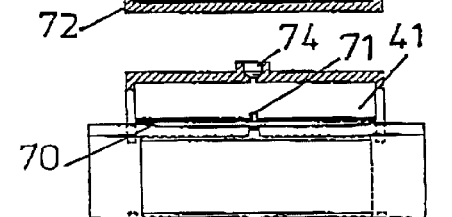
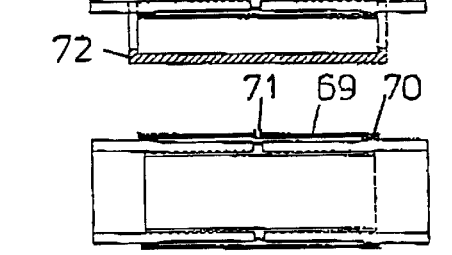
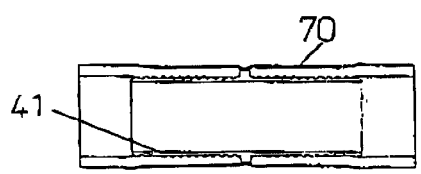

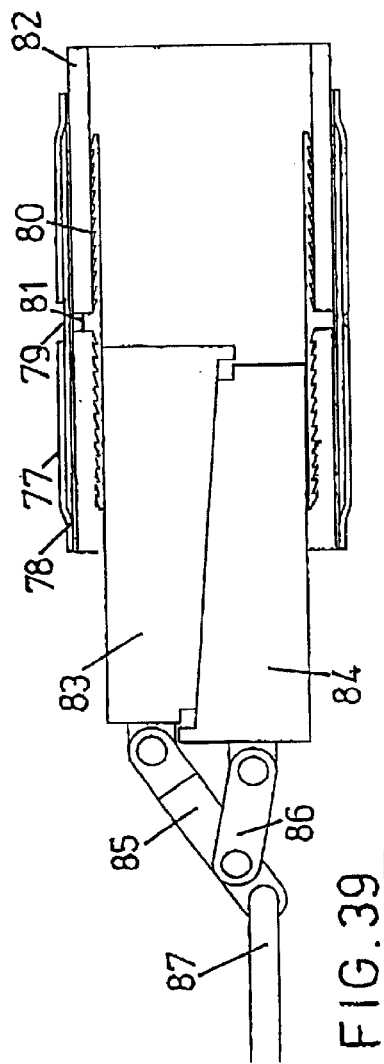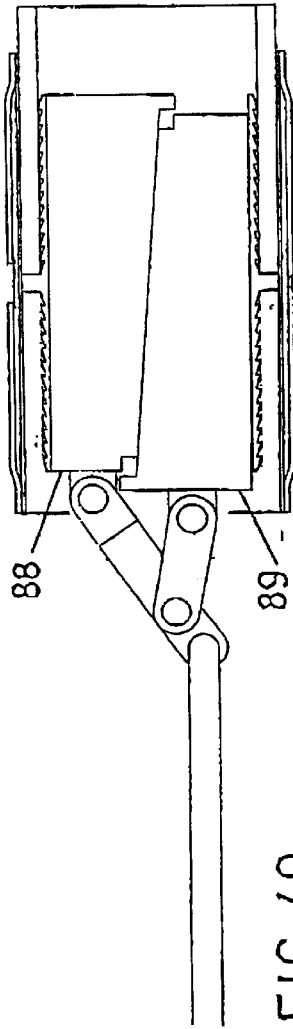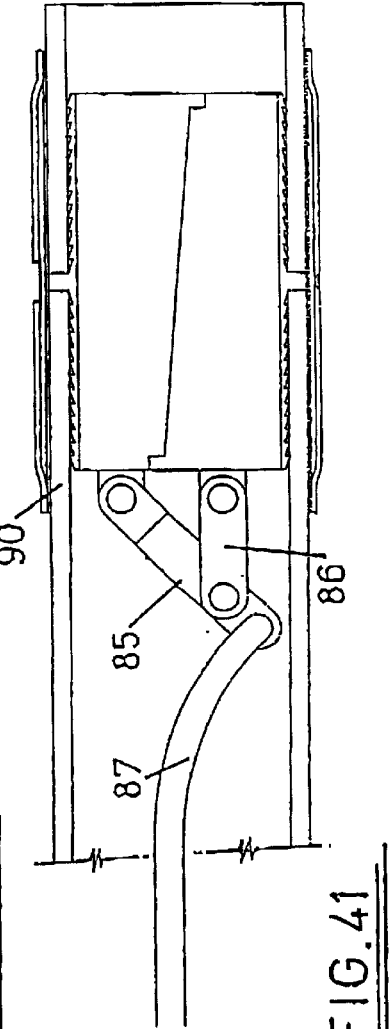

PIPE COUPLING

The present invention relates to a coupling and to a method for connecting an element such as a pipe to a coupling.

Many designs of couplings are known which seek to achieve a reliable sealed connection between the coupling and an element such as a pipe inserted into the coupling. Many known couplings rely upon mechanical compression of for example a deformable metal ring between a coupling socket and the outer surface of the pipe. Other couplings are known in which pipe to coupling seals are achieved using thermosetting intermediate components. The present invention is concerned with couplings which rely upon mechanical deformation of coupling components.

Mechanical couplings are used in circumstances in which it is often difficult to rely upon those responsible for assembling the couplings to carry out all the necessary procedures in a systematic manner. For example, where pipes to be interconnected are relatively easily deformable, for example HDPE pipes as widely used in the water and gas industries, it is necessary to push an insert into the end of a pipe to which a coupling is to be connected so as to prevent the pipe being excessively deformed radially inwards when the coupling is assembled, and with many couplings it is also necessary to position further components around the pipe which are not visible in the final assembly. External inspection of an assembled coupling does not enable the inspector to check that the insert and any other components have been properly positioned. It is also difficult to ensure that the pipe end inserted into a coupling is not contaminated with dirt to an extent which compromises coupling integrity. This is a real problem in circumstances in which mechanical couplings are used that rely upon only a limited axial interengagement between the external surface of the pipe and a radially compressed coupling element it is also not possible by visual inspection to check that sufficient force has been applied to coupling components to achieve a reliable interconnection. For example couplings which rely upon the application of a predetermined force by a crimping tool or relative rotation of a coupling body and a threaded compression element may appear on visual inspection to have been correctly assembled even if the required force has not been applied by the assembler.

A further problem with certain known couplings is that complex and cumbersome tools such as hydraulic presses are required for coupling assembly. This is particularly the case with large diameter couplings. Such tools cannot be readily used on-site, e.g. in trenches excavated to give access to buried pipes.

It is an object of the present invention to provide a coupling which enables the problems outlined above to be obviated or mitigated.

According to the present invention, there is provided a coupling comprising a tubular inner member defining a socket for receiving an element to which the coupling is to be connected, an outer member which extends around and defines an annular chamber with the inner tubular member, and an inlet communicating with the chamber to enable pressurisation of the chamber by introducing fluid to the chamber through the inlet, the inner member being radially compressible by pressurisation of the chamber to grip an element within the socket.

The invention also provides a method for connecting an element to a coupling comprising a radially compressible tubular member defining a socket into which the element is inserted, wherein a sealed chamber is defined around the tubular member, and pressurised fluid is introduced into the chamber, the pressure of the introduced fluid being sufficient to deform the tubular member radially inwards to grip the element.

With the coupling and method in accordance with the invention, the coupling is designed so that the user knows that providing sufficient pressure has been delivered to the coupling, the tubular inner member within the coupling socket will have been deformed to a sufficient extent to ensure a reliable connection. If the coupling is used with a readily deformable element such as an HDPE pipe, and no insert has been positioned within the pipe, the pipe will collapse under a relatively low applied pressure in a readily apparent manner. No other components can be accidentally omitted. Thus incorrect coupling assembly can be readily detected. Pressure can be applied up to a predetermined limit at which it is known from the design of the coupling that appropriate tube deformation has occurred. Alternatively, pressure can be applied until fluid leaks from a seal of the chamber, in which case seal failure can be taken as confirmation that the required pressure has been applied. For example a burst disc may be provided that will rupture when a predetermined pressure limit has been reached. The predetermined pressure limit may be for example 3000 psi (211 kg cm$^{-2}$). The pressurised fluid may be such that it sets inside the annular chamber so as to maintain support for the tubular inner member after the applied pressure is released The pressurised fluid may be delivered by a simple fluid pumping system.

Although the coupling has particular utility in connecting tubular pipes together, it could be used to make a connection to any element which could be inserted into the socket and which is dimensioned such that it is gripped after compression of the inner member.

Two seals may be located between the inner and outer members at positions spaced apart along the length of the inner tubular member and on opposite sides of the inlet, the seals closing ends of the annular chamber. The seals may comprise for example O-rings located between the inner and outer members, explosively welded joints, soldered joints, or brazed joints. Two pairs of seals may be provided, the seals of each pair defining a respective chamber communicating with a respective pressurised fluid inlet.

If means are provided for releasing pressurised fluid from the chamber if pressure within the chamber exceeds a predetermined limit, the pressurized fluid release means may comprise a burst disc incorporated in the outer member, or a seal between the inner and outer members which fail after a predetermined radial compression of the inner member.

The tubular inner member may define a radially inwards extending member to limit the depth of insertion of an element into the socket.

The outer member may be a tube of sufficient strength to resist expansion as a result of pressurisation of the chamber. Alternatively, the outer member is deformable and the inlet comprises means for engaging an opening in a support clamp within which the coupling may be received, the support clamp resisting radially outwards expansion of the outer member resulting from pressurisation of the chamber which communicates with the inlet. The inlet may comprise a tube extending through and radially outwards from the deformable outer member, the tube being adapted to be inserted into the clamp opening. The clamp opening may support a seal with which the inlet tube engages to prevent pressurisation fluid penetrating between the clamp and the deformable outer member.

Means may be provided for preventing loss of pressurisation fluid from the chamber. Such an arrangement is particularly suitable when the chamber is filled with a fluid which hardens after pressurisation of the chamber. The pressurisation loss preventing means may comprise a non-return valve in the inlet.

The tubular inner member may be a copper tube.

When the coupling is used with a deformable element such as a HDPE pipe, a tubular insert may be inserted into the end of the pipe, the insert being arranged to limit the radially inwards deformation of the pipe. The insert is preferably provided with surface formations to grip the pipe after radially inward deformation thereof, for example, circumferentially extending teeth, or circumferentially extending rectangular grooves, or openings extending radially through the insert. The insert may be attached to a flange. The end of the insert which is introduced first into the pipe may be outwardly flared, the length of the insert being less than the length of the socket, such that the portion of the pipe which is deformed radially inwards extends axially on both sides of the flared end of the insert.

The insert may have one end which in use is inserted inside the end of one of two pipes to be interconnected by the coupling and the other end of which in use is inserted inside the end of the other of the two pipes. The tubular insert may be ribbed to define an expansion joint to enable axial expansion and contraction of the tubular inset he tubular insert may be ribbed to limit the depth of insertion of the insert into the pipes.

A reinforcing member may be positioned inside the inner tubular member such that the reinforcing member is pressed radially against the element by pressurisation of the chamber. The reinforcing element may be a metal coil.

A reinforcing member may be positioned within the element during pressurisation of the chamber to prevent collapse of the element. The reinforcing member may comprise an insert which will be retained within the coupling and a removable body which is removed after pressurisation of the coupling. The removable body may comprise two interengageable wedge-shaped elements.

Embodiments of the present invention will now be described, by way of example, with reference to the accompanying drawings, in which;

FIG. 4 is a sectional view of components of a second coupling in accordance with the present invention and two pipe ends prepared for insertion into the coupling;

FIG. 5 is a view similar to that of FIG. 4 after insertion of the pipe ends into the coupling.

FIG. 6 is a view similar to that of FIG. 5 after components of the coupling have been deformed to grip the pipe ends;

FIG. 10 is a sectional view of component parts of a further coupling in accordance with the present invention and two pipe ends prior to their insertion into the coupling;

FIGS. 11, 12 and 13 illustrate the sequential assembly of the components shown in FIG. 10;

FIG. 14 illustrates the component assembly of FIG. 13 after the introduction of a settable resin into the assembly;

FIG. 15 illustrates the assembly of FIG. 14 after the application of substantial end load;

FIG. 21 and 22 illustrate alternative pipe inserts used with the coupling of FIG. 16;

FIGS. 23 and 24 illustrate the use of a metal coil to improve axial strength;

FIG. 26 is a sectional view of a coupling similar to that of FIG. 16 but incorporating an inlet valve;

FIG. 27 is a detailed view of the inlet valve of FIG. 26;

FIG. 28 illustrates the sequential assembly of a coupling to join two flexible pipes together;

FIGS. 32, 33, 34, 35, 36 and 37 illustrate the sequential assembly of a further coupling in accordance with the present invention in both cross sectional and vertical sectional views;

FIGS. 39, 40 and 41 show the insertion of a reinforcing device into an insert of a coupling according to the invention.

Figures 1, 2, 3:
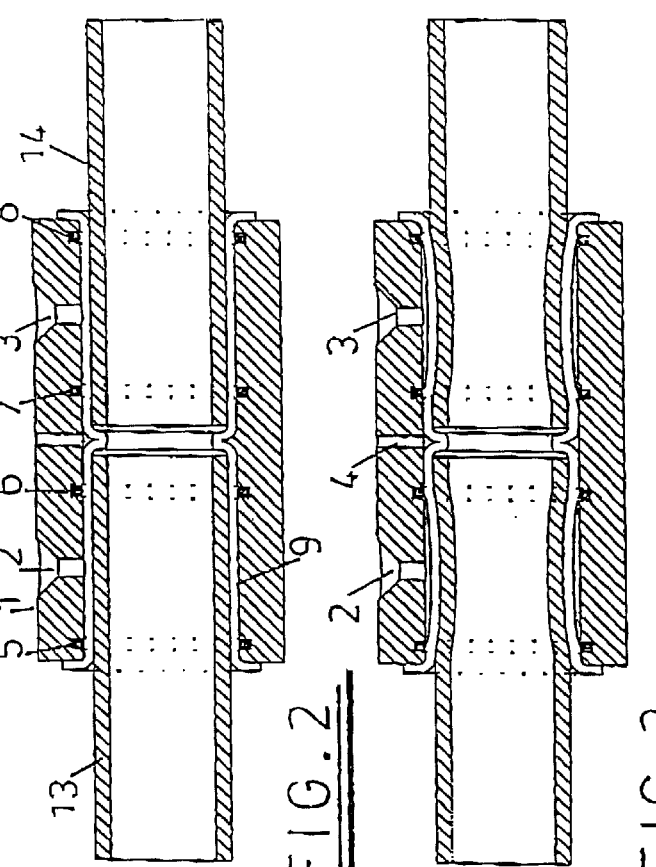
FIG. 1 is a sectional view of a coupling in accordance with the present invention and of two pipe ends prior to their insertion into the coupling.
FIG. 2 is a view similar to that of FIG. 1 but after insertion of the pipe ends into the coupling.
FIG. 3 is a view similar to that of FIG. 2 after deformation of a component of the coupling to securely grip the inserted pipe ends.

Referring to FIG. 1, the coupling illustrated comprises an outer body 1 of generally tubular configuration, the wall of the body being penetrated by two inlets 2 and 3 and an outlet 4. Four O-rings 5, 6, 7 and 8 are received within grooves extending around the inner wall of the coupling body. A single deformable tube 9 is inserted into the coupling body, the ends 10 and 11 of the tube being bent over to engage against the ends of the coupling body and thereby to retain the tube within the body. A central section 12 of the tube is deformed to define an inwardly extending rib to limit the depth of insertion of two pipes 13 and 14 which are to be interconnected by the coupling.

FIG. 2 shows the components of FIG. 1 after insertion of the pipes 13 and 14 into the two sockets defined by the tube 9. Given the relative positions of the sealing rings 5 and 6 and the inlet 2, and the relative positions of the seals 7 and 8 and the inlet 3, two sealed chambers are defined between the outer wall of the tube 9 and the body 1.

Referring to FIG. 3, the coupling is completed by injecting pressurised fluid through the two inlets 2 and 3. As the pressure within he inlets 2 and 3 increases, the tube 9 is progressively deformed inwards until one of the seals fails as a result of extrusion. Inward deformation of the tube 9 causes inward deformation of the pipe ends 13 and 14, the extent of the deformation of the tube 9 and the pipe ends 13 and 14 being a function of the applied pressure. Seal failure occurs when the deformation of the tube 9 has propagated to a sufficient extent as to open a gap between the tube 9 and one of the seals. At that point the injected pressurised fluid starts to leak out either through the ends of the coupling or through the outlet 4. Such leakage can be easily visually detected and at that point the supply of pressurised fluid is cut off. The degree of deformation and hence the security of the grip of the tube 9 on the pipe ends is a function of the applied pressure which in turn is a function of the characteristics of the tube 9 and the seal. Thus the coupling installer can be sure that, assuming the coupling components have been appropriately manufactured, once leakage occurs a reliable connection has been made.

In the embodiment of the invention illustrated in FIGS. 1 to 3, the pipes to be interconnected are assumed to be manufactured from a material which is deformable to an extent to allow deformation of the tube 9 but which retains the shape into which it is deformed over prolonged service use. This may not be the case in many circumstances, for example where the pipes to be interconnected are manufactured from a plastics material such as HDPE. The embodiment of the invention illustrated in FIGS. 4 to 6 can be used reliably with such pipe materials.

Referring to FIG. 4, the illustrated coupling comprises a body 15 supporting a single pair of seals 16 and 17 and defining a single inlet 18. A single tube 19 is received within the coupling body, the tube defining an inwardly extending rib 20 to limit pipe insertion. Pipe ends 21 and 22 which are to be inserted into the coupling first receive inserts 23 and 24. As can be best seen in the case of insert 23, the end of the insert which is first inserted into the pipe end is outwardly flared, the other end defining a flange to limit the depth to which the insert can be pushed into the pipe.

FIG. 5 shows the components of FIG. 4 after insertion of the pipe ends into the coupling. It will be noted that the inserts are substantially shorter than the insertion depth of the pipe ends such that the flared ends of the inserts are spaced from the closest adjacent seals.

FIG. 6 shows the assembly of FIG. 5 after the application of pressure to the inlet 18. Pressurised fluid fills the sealed chamber defined between the coupling body, the tube 19 and the seals 16 and 17. The radially inwards deformation of portions of the tube which are located radially outside the inserts is limited by the presence of the inserts, but the pipe is tightly gripped between the tube 19 and the inserts and the flared end of the inserts bite into the inner surface of the pipes. The two portions of the tube 19 and the pipe ends located between the flared ends of the inserts and the seals 16 and 17 are deformed to a greater extent than those portions which are radially outside the insert As a result if any end load is applied to the pipes, the pipes can only be pulled out if the force applied is so large as to either pull the pipe over the flared ends of one of the inserts or is sufficient to drag the inserts past the relatively narrow neck of the deformed tube 19 located between the flared ends of the inserts and the seals. Such an arrangement accordingly provides very good pull-out resistance even when used with materials such as HDPE which in known couplings have a tendency to "creep" over a long service life.

Figure 9:
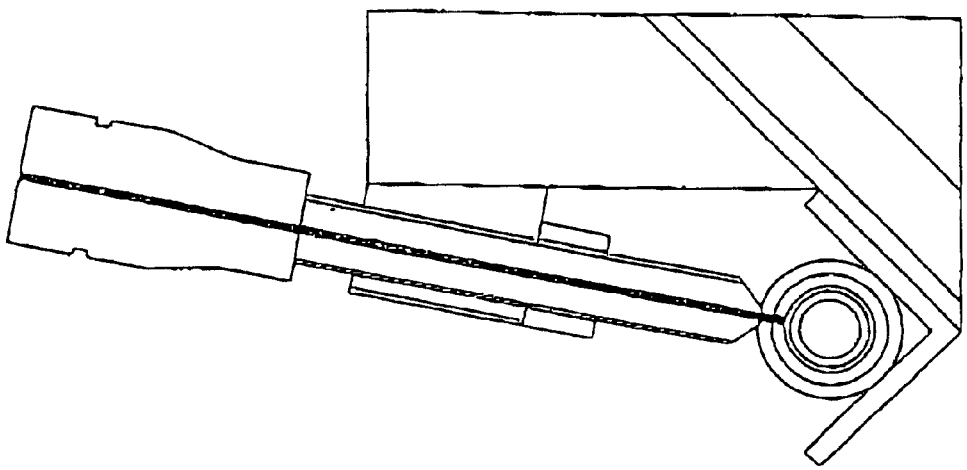
FIG. 9 illustrates the injection of a pressurised fluid into the coupling of FIG. 7 and 8.
Figure 8:
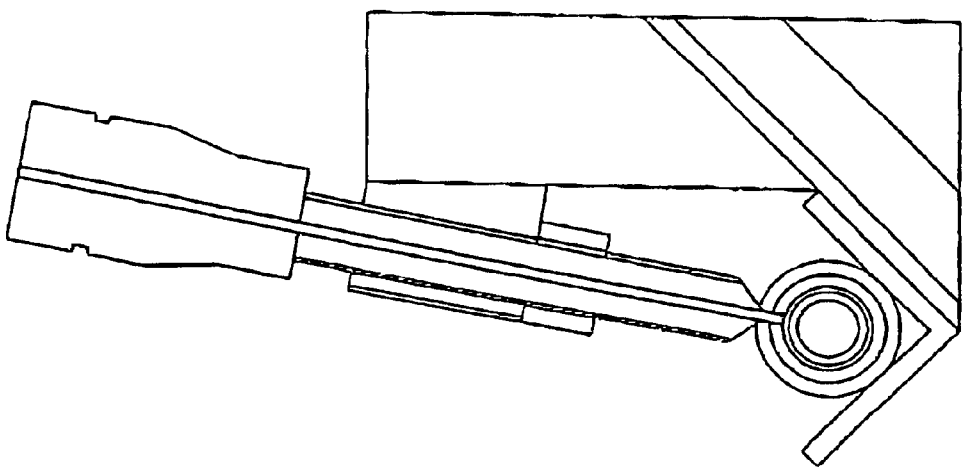
FIG. 8 is a view similar to that of FIG. 7 after the apparatus has been advanced into engagement with a coupling.
Figure 7:
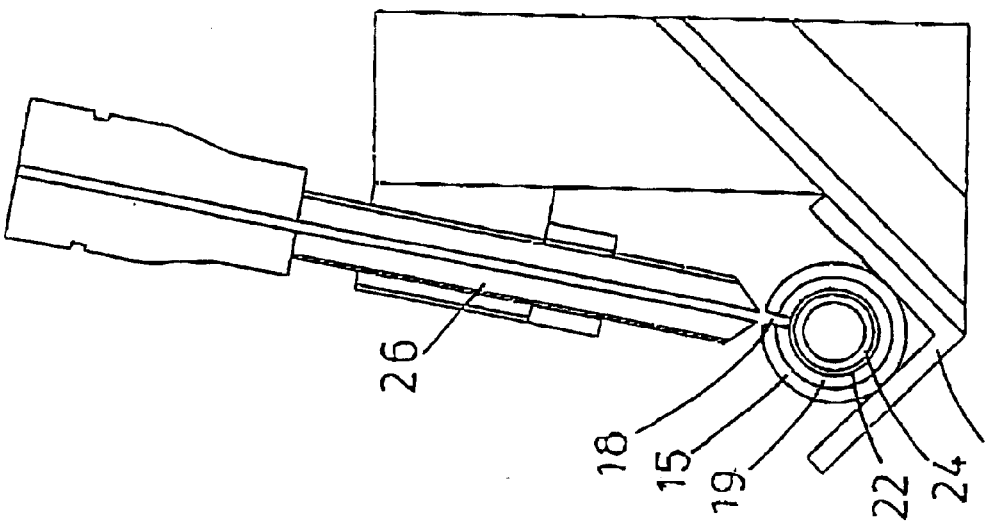
FIG. 7 is a schematic part-sectional view of an apparatus which may be used to deform the coupling components in the manner shown in FIG. 6.

Referring to FIGS. 7, 8 and 9, an apparatus is illustrated which may be used to inject pressurised fluid into a coupling such as that illustrated in FIG. 3 or FIG. 6. In FIG. 7, 8 and 9, the illustrated coupling is assumed to be that shown in FIGS. 4 to 6. Accordingly FIGS. 7 to 9 show a coupling body 15, the tube 19, the pipe 22 and the insert 24.

The illustrated apparatus comprises an angle bracket 25 which is used to support the coupling body 15 so that the inlet 18 is aligned with the tip of an injector 26. As shown in FIG. 7, the injector is in a retracted position to enable the apparatus to be manoeuvred into a position in which the injector 26 is aligned with the inlet 18.

The injector is then advanced to the position shown in FIG. 8 so that the conical tip of the injector makes a seal with the countersunk outer end of the inlet 18. Pressurised fluid is then injected as indicated by the shaded area of FIG. 9 so as to cause the tube 19 to deform as described with reference to FIGS. 4 to 6.

Fluid may be injected from any suitable device, for example a hand-operated or motor driven pump. The injected fluid could be for example mineral oil although in some applications for example in the water industry it may be appropriate to use a different fluid which could not in any circumstances cause unacceptable contamination. For example it is possible to use water or vegetable oil as the injection fluid. The injection fluid may incorporate for example a dye so that once it escapes from the coupling after seal failure this will be evident during subsequent inspection. To assist in the inspection of assembled couplings, it might be desirable to arrange for a seal which fails due to extrusion to be visible outside the coupling body.

The couplings as described may be manufactured from any appropriate material. For example the coupling bodies could be manufactured from mild steel, the deformable tubes could be manufactured from annealed copper, and the inserts of the embodiment of FIGS. 4 to 6 could be manufactured from stainless steel.

Referring now to FIGS. 10 to 15, a further embodiment of the invention will be described. FIG. 10 shows a body 27 in which a tube 28 is received, the tube defining an inwardly extending rib 29 which is located adjacent an inlet opening 30 formed through the wall of the body 27. The axial ends of the tube and body are soldered together such that a sealed chamber is defined between the tube 28 and the body 27 into which a pressurised fluid maybe injected through opening 30.

An insert 31 is provided which defines two outwardly extending ribs 32 and outwardly flared ends 33. The ends 33 are sized to be an easy sliding fit inside pipe ends 34. The body 27 may be fabricated from steel, the tube 28 may be fabricated from copper, and the insert 31 may be fabricated from stainless steel.

To assemble the coupling as shown in FIG. 10, the insert 31 is first pushed into one of the pipe ends as shown in FIG. 11. That pipe end and the insert is then pushed inside the coupling body until the pipe end bears against the rib 29 defined by the tube 28 as shown in FIG. 12. The other pipe is then pushed inside the body so as to slip over the adjacent end of the insert 31 until it bears against the adjacent rib 32 as shown in FIG. 13. The assembly is then in a condition in which a pressurised fluid can be injected through the opening 30.

FIG. 14 shows the assembly of FIG. 13 after the injection of a resin through the opening 30. The injected material is made up of two components which when mixed set to form a compression-resistant solid body. The resin is injected at a pressure sufficient to compress the pipe ends against the insert 31 and to cause further radially inward extension of portions of the pipes lying between the flared ends of the inserts and the soldered seals defined between the body 27 and the tube 28.

If extreme end loads are applied to the pipe 34 it may be that the pipe ends will be pulled a short distance out of the coupling body to the position shown in FIG. 15. The ribs 32 enable this to occur, acting in effect as an expansion joint. As the two ends of the insert are pulled apart, the flared insert ends 33 move to a position radially inside the relatively thick body of resin initially formed between the insert ends and the soldered seals. The grip on the pipe thus increases as the insert ends 33 can only be pulled further out of the coupling body by further extrusion of the pipe wall from immediately adjacent the flared insert ends 33. Thus very high end load resistance is achieved. Furthermore, if the end load is subsequently released or reversed and the insert ends are pushed together so as assume once again the positions shown in FIG. 14, any damage to the outer surface of the pipe ends 34 does not result in leakage as no relative movement occurs between the pipe ends and the insert 31. The illustrated coupling is thus extremely reliable even in conditions when substantial and varying end loads may be applied.

A settable resin may be injected through the opening 30 from a pump in which two components of the resin are mixed in a nozzle which is applied against the opening 30. A simple pressure indicating device may be provided to indicate the magnitude of the applied pressure so that the installer can be sure that the appropriate pressure is applied to the injected resin. Alternatively the coupling may be arranged to provide a physical indication of the application of an appropriate pressure, for example as a result of seal failure or the like.

It will be noted that in the arrangement illustrated in FIGS. 10 to 15 relatively thin-walled components may be used. This is highly advantageous in circumstances where the outside diameter of the coupling should not be substantially greater than the outside diameter of the pipes to be interconnected, for example in situations where a coupling has to be pulled through an expanded pipe which is to be replaced.

Figure 16:
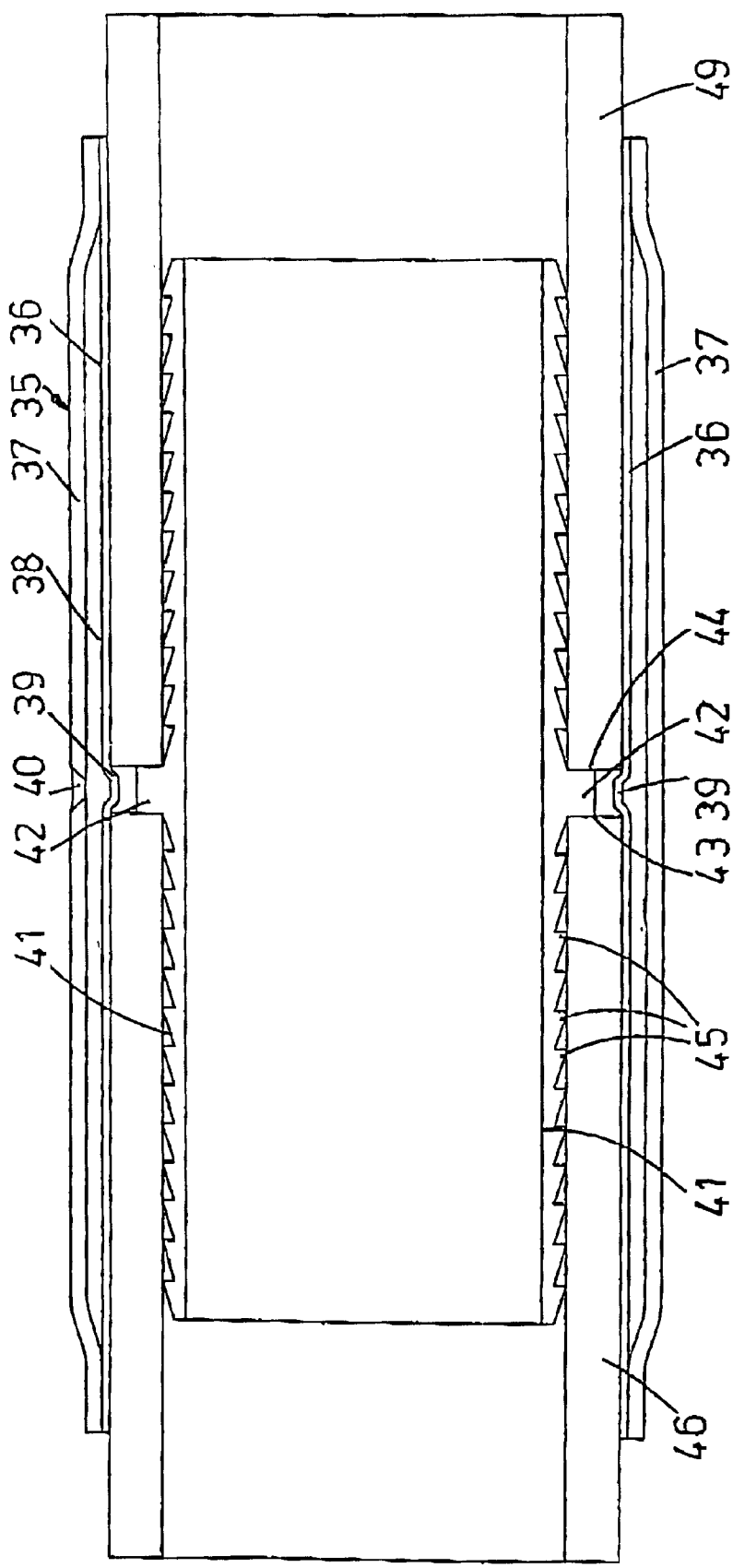
FIG. 16 is a sectional view of a component assembly of a further coupling in accordance with the present invention.
Figure 17:
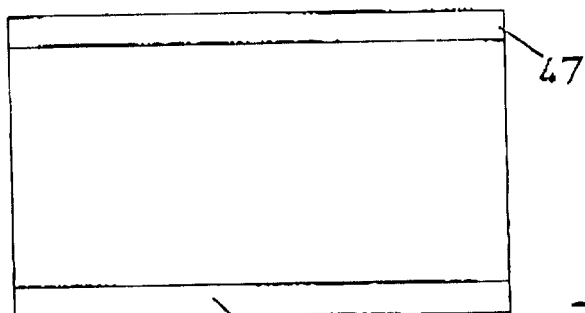
FIGS. 17, 18, 19 and 20 illustrate the sequential assembly of the coupling shown in FIG. 16.
Figure 18:
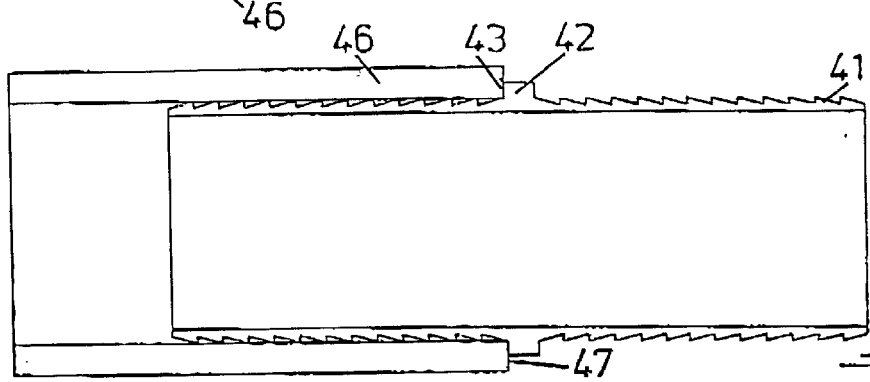
Figure 19:
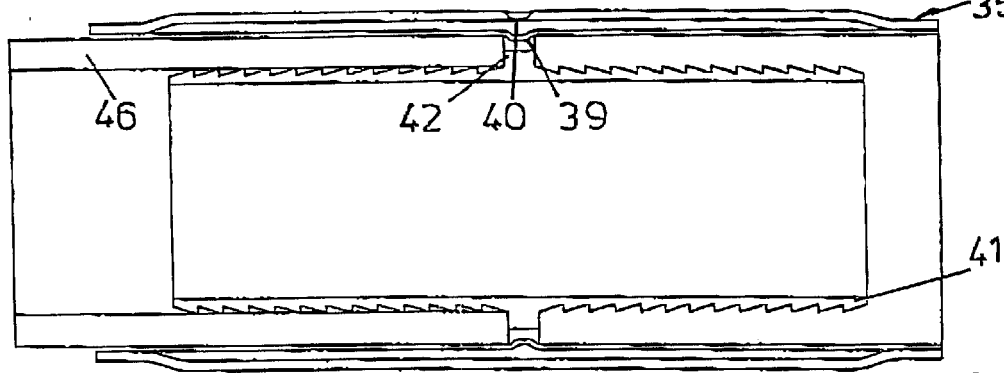
Figure 20:
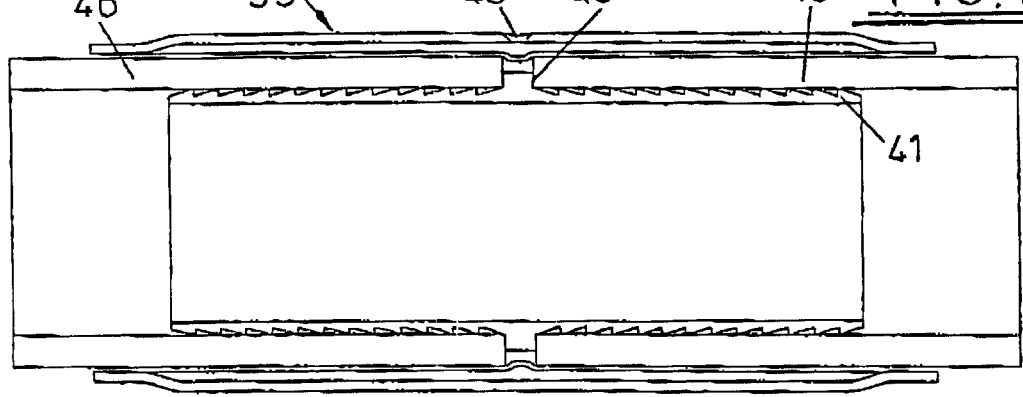

Referring now to FIG. 16, a firer embodiment of the invention will be described. A pipe coupling 35 is formed from an inner tube 36 of copper or another suitable material and an outer body 37 formed of steel. The axial ends of the tube and body are soldered together to define a sealed chamber 38 therebetween. An inwardly directed lip 39 is defined by a reduced diameter central area of tube 36. An inlet 40 to chamber 38 is provided in outer body 37, into which a pressurised fluid may be injected.

A single piece steel pipe insert 41 is provided, having a central rib 42 defining two shoulders 43, 44. Insert 41 has a stepped outer surface defining teeth 45 having a saw tooth shape. The insert 41 may alternatively be provided in two pieces that abut in the assembled coupling. The two insets could for example have flat faced flanges that are held together by the inner tube 36 when collapsed and between which a suitable sealing washer could be received. Alternatively the acing surfaces of the flanges could be conical, concentric or positively mating arrangements. The two pieces could also be interconnected by a bayonet-type fitting, male and female screwed connections having an o-ring or washer seal, male screwed connectors and a female collar, or any other suitable connection. The advantage of holding the inserts together by means of the inner tube 36 when collapsed engaging flat faced flanges is that of mechanical simplicity, whereas screwed or otherwise interengaged inserts would support a greater end loading force. Preferably a seal is provided between the inserts to contain the contents of the pipe, rather than relying upon the tube 36 to contain the pipe contents.

FIGS. 17 to 20 illustrate the sequential assembly of the coupling of FIG. 16. A first pipe 46 is made ready for coupling by for example smoothing an end 47 thereof. An end of insert 41 is then pushed into pipe 46 until end 47 abuts shoulder 43. Coupling 35 is then placed over the end of the pipe 46 and insert 41 so that lip 39 abuts the end 47 of the pipe. An end 48 of a second pipe 49 is then inserted into the other end of coupling 35, between insert 41 and inner tube 36 until end 48 abuts shoulder 44 and lip 39.

A pressurised fluid is then injected into chamber 38 by means of a pump connected to inlet 40, causing inner tube 36 to collapse, thereby sealing the ends of the pipes against insert 41. The fluid may be grease (which may be used to prevent water ingress), water, vegetable oil (which is preferred if the coupling is used with water supply pipes), a hardenable resin, or any other suitable fluid. Resin is particularly suitable for use in applications where the pipes carry a high pressure as the collapsed inner tube 36 benefits from some support from the outer tube 37 due to the hardened resin. A one-way valve such as a grease nipple may be provided in inlet 40 to retain the grease or other fluid in the chamber 38. The pressure created in the chamber 38 by injection of the fluid is 3000 psi (211 kg cm$^{-2}$), and the collapse of the inner tube 36 causes the teeth 45 provided on insert 41 to grip the pipe surfaces.

In one embodiment of a coupling of the type shown in FIG. 16, the outer steel body 37 may have an overall length of 100 mm, an outer diameter of 71.9 mm except at the tapered ends, an inner diameter of 66.8 mm at the tapered ends, and a wall thickness of 1.5 mm. The inner tube 36 may be of copper tube with a wall thickness of 16 SWG and formed from C106 half hard copper. The ends of the copper tube are brazed to the inner surfaces of the tapered ends of the outer body 37. The copper tube has an overall length of 100 mm and an outside diameter of 66.7 mm. The insert 41 may have an outside diameter of 49.8 mm with a maximum tooth depth of 0.5 mm. The insert may be of steel with a material thickness of 10 SWG.

Figure 21:
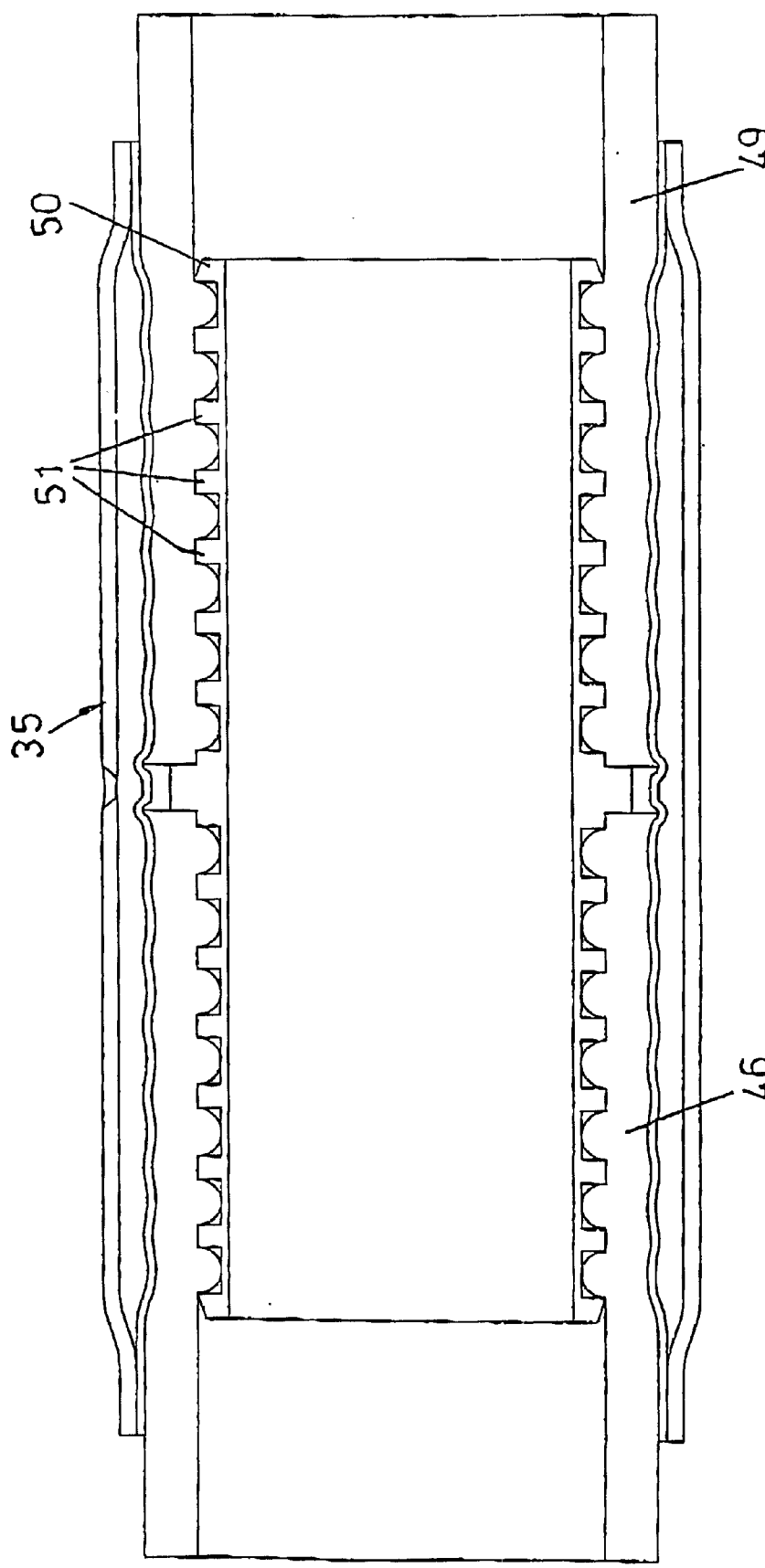

Alternative forms of pipe insert 41 may be used, FIG. 21 illustrating an insert 50 having rectangular grooves located between ribs 51 provided on its outer surface in place of teeth 45, and FIG. 22 illustrating an insert 52 having apertures 53 into which the gripped pipes can be deformed. With the embodiments of FIGS. 21 and 22, the copper tube is deformed in an irregular manner with the deformation being greater in regions of the tube facing the rectangular grooves or apertures. These irregularities in the copper tube contribute to end load resistance (axial strength). Furthermore, joints with such insert formations may be formed using relatively lower pressures.

FIGS. 23 and 24 illustrate the use of a metal coil 54 that may be placed between the outer surface of the pipes and the inner tube 36. Coil 54 helps to prevent the pressure from the collapsing inner tube 36 from causing the pipe end insert also to collapse inwardly. This makes it possible to use a relatively thin pipe insert 41.

Figure 25:
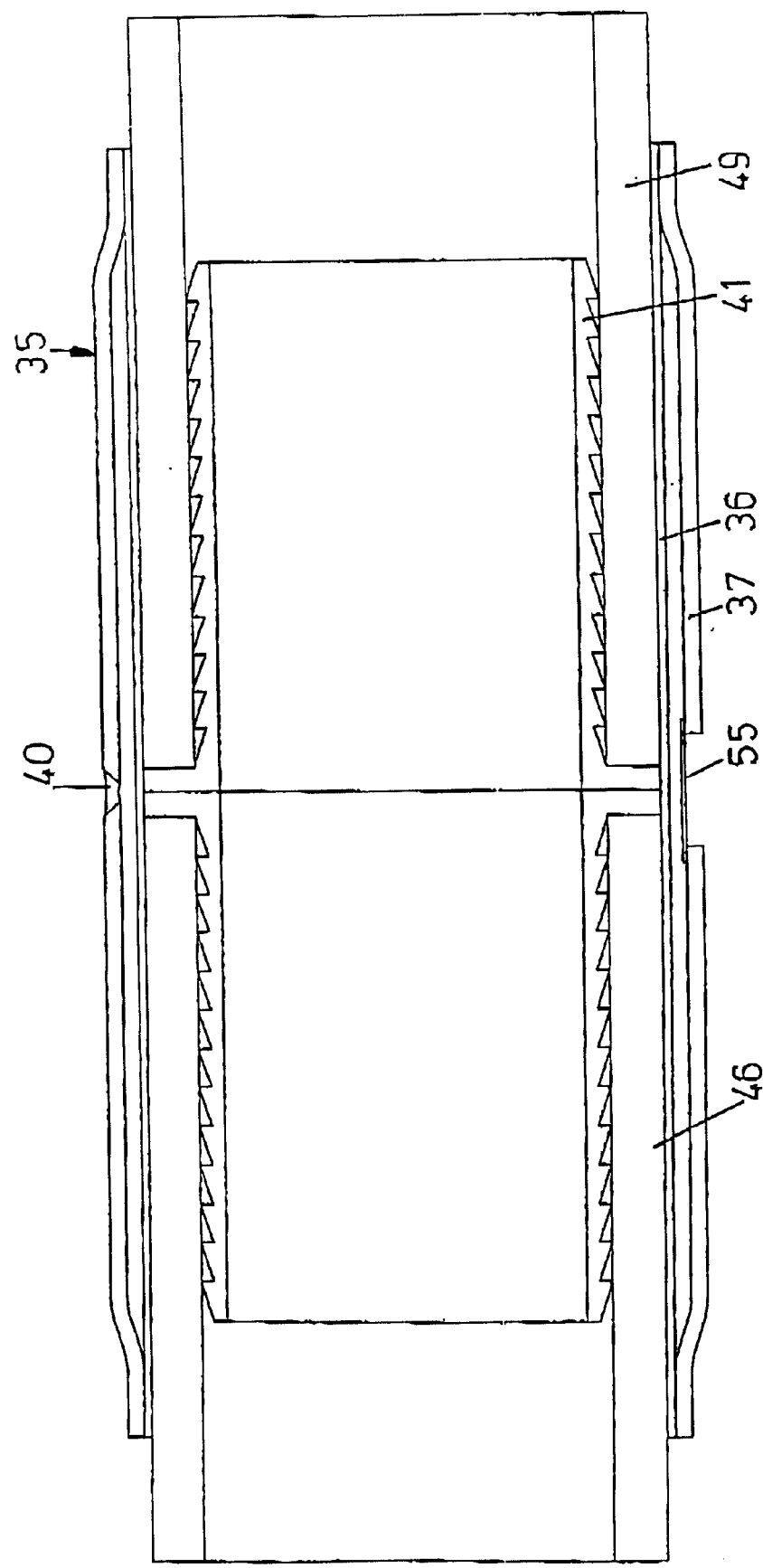
FIG. 25 is a sectional view of a coupling similar to that of FIG. 16, showing a burst disc pressure release device.

The pressure applied to the chamber as fluid is introduced may be controlled using a burst disc 55 as illustrated in FIG. 25 or a simple pressure gauge or pressure release valve connected to the fluid pump to indicate to the operator when the correct pressure has been reached inside the chamber.

Referring now to FIGS. 26 and 27, the inlet 40 may include a valve comprising a ball 56 biased into position in inlet 40 by means of a sprig 57 that is located within lip 39. The spring 57 biases the ball 56 to close the inlet 40, the ball 56 being pushed back against the biasing force of the spring 57 when an injection device or pump is offered up to the inlet 40 and fluid is delivered to the inlet under pressure.

FIG. 28 illustrates the sequential assembly of a coupling similar to that of FIG. 16, but with a pipe insert formed in two pieces 58, 59. This is particularly suitable when the pipes are already in situ and cannot be axially moved relative to one another. Ends of pipes 46, 49 are each displaced sideways so that access is gained to the ends of the pipes. An insert 58, 59 is placed into the end of each pipe, and a coupling 35 placed over the end of one of the pipes. The pipe ends are then brought together and the coupling 35 slid along the pipes to overlap the ends of both pipes. In this instance, a lip 39 cannot be provided on coupling 35. The pressurised fluid is then injected into chamber 38, as previously described.

Figure 30:
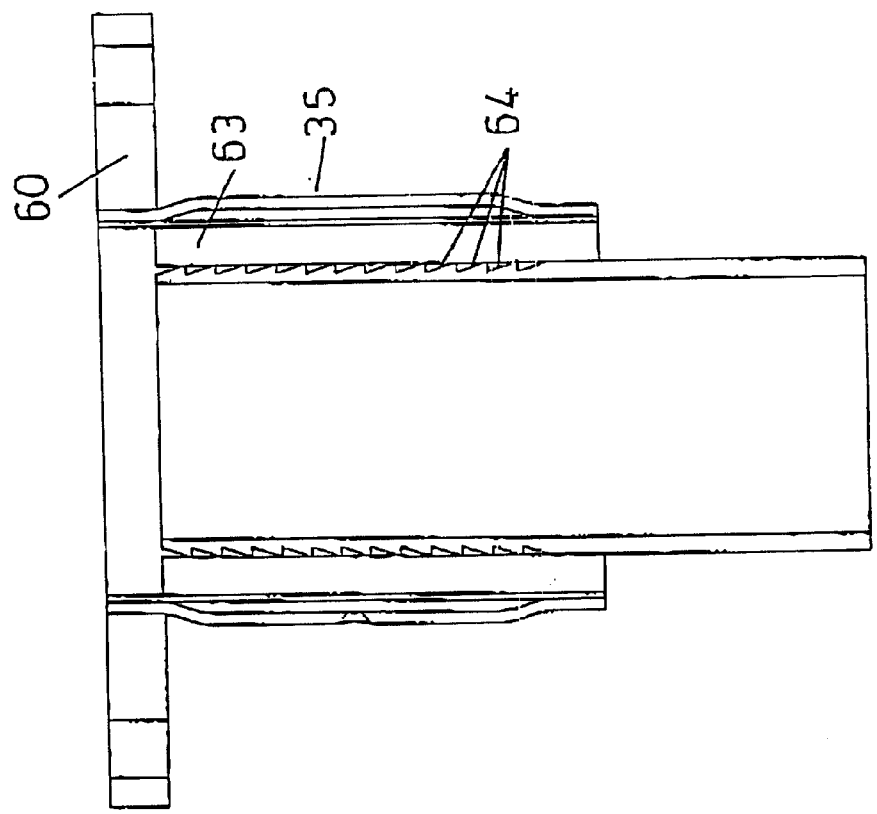
FIG. 30 is a sectional view of a coupling used to couple a steel pipe to a flange.
Figure 29:
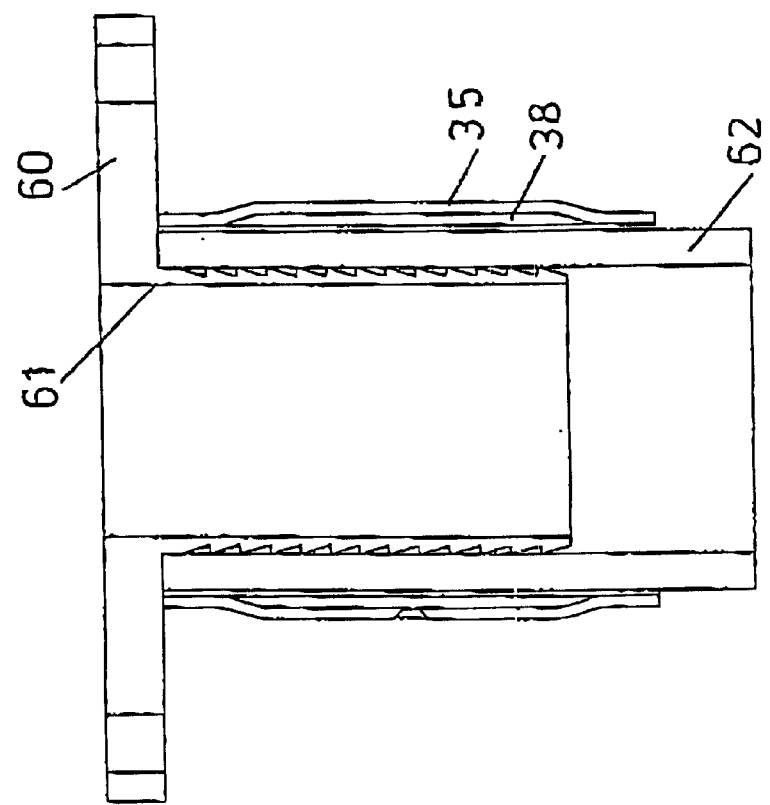
FIG. 29 is a sectional view of a coupling used to join a plastics pipe to a flange-mounted spigot.

FIGS. 29 and 30 illustrate the use of a pipe coupling according to the present invention to connect a flange to a pipe. The arrangement of FIG. 29 is used for a coupling between a steel spigot of a flange and HDPE or other plastics pipe, whereas the arrangement of FIG. 30 is used for a coupling between a flange and a steel or other metal pipe. Referring to FIG. 29, a flange 60 supports a spigot 61. A coupling 35 is positioned on the end of a pipe 62 which then receives the spigot 61, and pressurised fluid is then injected into chamber 38 as previously described. The flange 60 may then be used to connect the pipe 62 to another flange. Referring to FIG. 30, a coupling 35 is welded into an annular opening in a flange 60. A short length of plastics pipe 63 is slipped onto a metal pipe in which saw-tooth shaped teeth or grooves 64 are cut. The coupling is then slipped over the pipe 63 such that teeth 64 are positioned inside both the plastics pipe 63 and the coupling 35. Pressurised fluid is injected into coupling 35, the collapse of inner tube 36 causing the plastics pipe 63 to deform inwardly and become engaged with teeth 64. The plastics pipe 63 could be a hot or cold shrunk plastics tube which is shrunk into secure engagement with the metal pipe before the coupling 35 is placed in position around the pipe 63.

Figure 31:
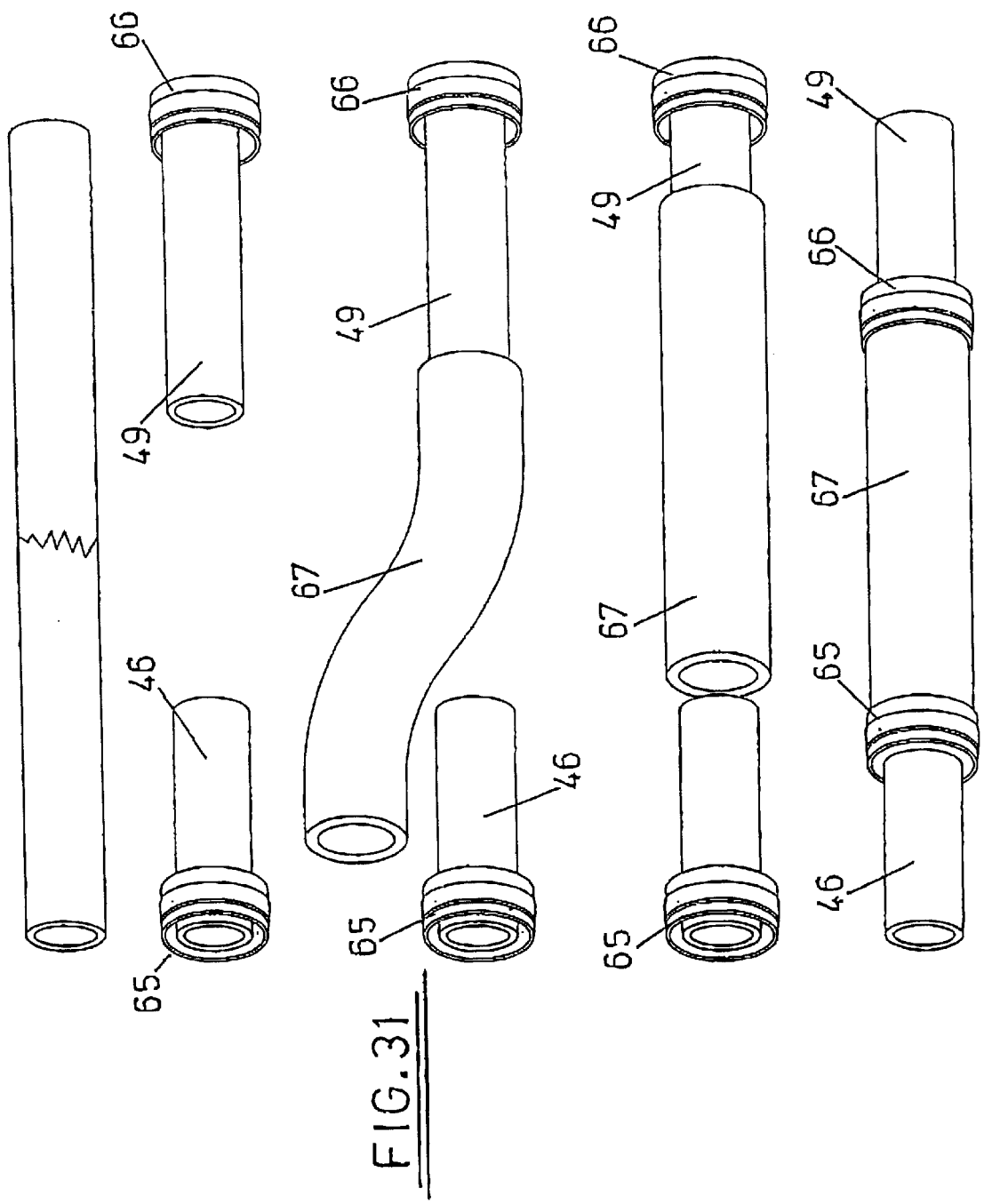
FIG. 31 illustrates the sequential assembly of two couplings and a plastics pipe to repair a damaged steel pipe.

FIG. 31 illustrates the procedure followed when repairing pipes which cannot be bent sideways, for example if the pipes arc formed of iron. The damaged section of the pipe is cut away to leave two pipe ends having a gap therebetween. Two couplings 65, 66 are placed over the ends of the iron pipes, the couplings being similar to the coupling illustrated in FIG. 30, but omitting the flange. A length of plastics pipe 67 is then slid onto one of the iron pipes far enough so that its free end may be slid onto the other pipe. The plastics pipe 67 is then positioned so that it overlays the gap between the iron pipes. The couplings 65 and 66 are then placed onto the ends of plastics pipe 67 and secured by the application of pressure as previously described. This procedure makes it easy to repair a fractured pipe without having to use a length of pipe made of the same material as the fractured pipe.

Referring now to FIGS. 32 to 38, a further embodiment of the invention will be described. A coupling 68 comprises an outer tube 69 of rubber and an inner tube 70 of copper. Initially the tube 70 is contacted by the tube 69 along all of its length and therefore the two tubes are not shown separately in FIGS. 32 and 33. An inlet tube 71 is provided in the outer tube 69, and ends of the tube 69 and 70 are sealed together with for example adhesive such that the inlet tube 71 communicates with a chamber defined between the tube 69 and 70.

Figure 38:
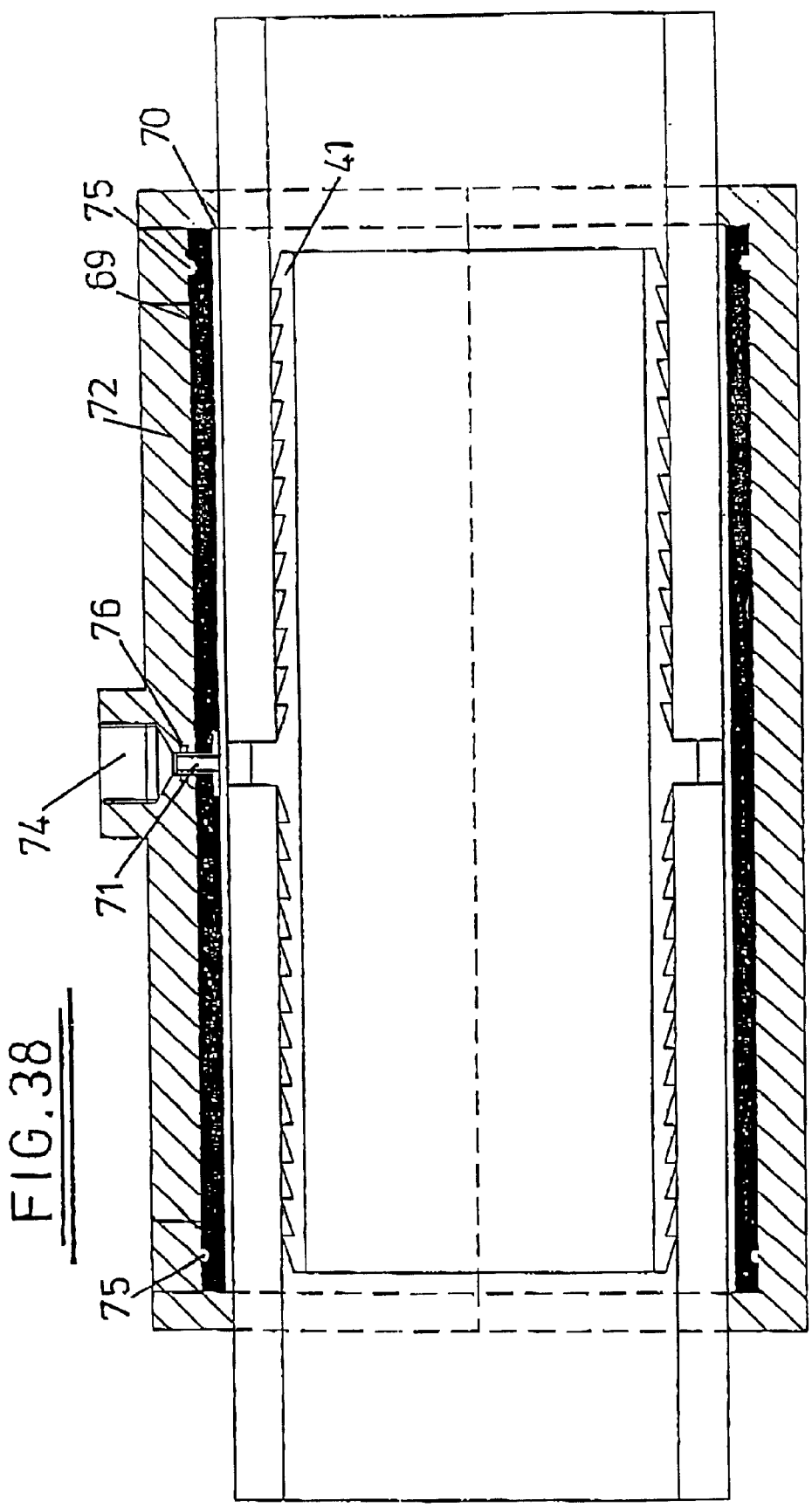
FIG. 38 is an enlarged view of the right-hand part of FIG. 33.

In order to assemble the coupling and pipes, a pipe insert 41 as shown in FIG. 16 is first inserted into an end of a first pipe, coupling 68 is slipped onto the first pipe, and a second pipe is slipped onto insert 41. A two-piece clamp 72 is then placed in position around coupling 68, and is secured by means of over-centre latches 73. An inlet 74 is provided in clamp 72 that is aligned with inlet tube 71 of body 69. The clamp 72 need not be a perfect fit around the pipes, but must be a sufficiently good fit as to prevent axial extrusion of the rubber tube 69. As shown in FIG. 38, ribs 75 are provided on an inner surface of clamp halves 72, which engage the rubber tube 69, and help to retain tube 69 in place.

Pressurised fluid is injected via inlets 74 and 71 into the space between inner tube 70 and rubber tube 69. This causes the inner tube 70 to collapse inwardly, the clamp 72 limiting outwards expansion of the rubber tube 69. A seal 76 carried by the clamp 72 engages around the inlet tube 71 to prevent pressurised fluid entering the space between the rubber tube 69 and the clamp 72. Thus the injected fluid enters the sealed chamber between tubes 70 and 69, the tube 70 is displaced radially inwards, and the inner surfaces of the pipes engage the insert 41.

Clamp 72 is then removed from the pipes, and rubber tube 69 may be cut off to leave just the tube 70 in place on the pipe. The result is a very low profile coupling as shown in FIG. 37.

It should be appreciated that for all embodiments of the present invention, the inner tube that forms the seal around the pipe does not need to be made of copper, as described, but could be made of any suitable material (for example aluminium) that will deform as required and retain the shape into which it has been deformed.

For embodiments of the present invention to function effectively it is necessary to ensure that the pipe to which a connection is to be made can resist the radially inwards forces applied when pressurised fluid is introduced into the coupling. In the case of plastics pipes, the necessary resistance to the compressive forces applied by the coupling is provided by an insert pushed into the end of the plastics pipes. With large diameter pipes, thick walled inserts may be required to provide the necessary support for the plastics pipe during the application of pressure, and it may be undesirable to use inserts with the required wall thickness. It is possible however to avoid the use of an insert with an undesirably thick wall by providing reinforcement to a relatively thin-walled insert during coupling pressurisation, the reinforcement subsequently being removed. One possible arrangement for providing insert reinforcement is illustrated in FIGS. 39 to 41.

Referring to FIGS. 39 to 41, the coupling comprises an outer body 77, an inner copper tube 78, a burst disc 79 in the outer body to limit the pressure to be applied between the outer body and the inner copper tube, and an insert 80 defining a flange 81. As shown in FIG. 39, the insert 80 is pushed into the end of a pipe 82 until the flange 81 bears against the free end of the pipe 82. The coupling 77, 78 is then slipped onto the end of the pipe 82. Thereafter a reinforcing device comprising two relatively slidable wedge-shaped body elements 83 and 84 is pushed into the insert The body elements 83 and 84 have facing ramp like surfaces such that given the position of the body elements shown in FIG. 39 the outside diameter of the reinforcing device is a maximum such that the reinforcing device is a close sliding fit inside the insert 80. The body elements 83 and 84 are connected by levers 85 and 86 to a cable 87. After positioning the reinforcing device in the insert 80 as shown in FIG. 39, a further pipe 88 is pushed onto the insert 80, the cable 87 extending through the pipe 88 also as shown in FIG. 39.

The device is then pressurised until the burst disc 79 indicates that the appropriate pressure has been applied Although not shown in FIGS. 39 to 41 , this will force the ends of pipes 82 and 88 into the grooves defined by the insert 80. The insert 80 is supported by the reinforcing device, radial compression of the insert resulting in the insert 80 being a tight fit on the reinforcing device.

After the applied pressure is released, the reinforcing device is pulled out of the insert within which it is now a tight fit by tensioning the cable 87, the levers 85 and 86 operating such that axial force applied to the cable 87 initially pulls the reinforcing body element 83 to the position relative to the body element 84 as shown in FIG. 40. The reinforcing element can then be pulled out of the insert 80 as shown in FIG. 41, and then pulled through the pipe 88.

What is claimed is:

1. A coupling comprising a tubular inner member defining a socket for receiving an a tubular deformable element to which the coupling is to be connected, an outer member which extends around and defines an annular chamber with the inner tubular member, and an inlet communicating with the chamber to enable pressurisation of the chamber by introducing fluid to the chamber through the inlet, the inner member being radially compressible by pressurisation of the chamber to grip an the tubular deformable element within the socket, wherein the coupling comprises a tubular insert which in use is inserted into the end of the tubular deformable element to which the coupling is to be connected, the tubular insert being arranged to limit the radially inwards deformation of the tubular deformable element and being provided with surface formations to grip the tubular deformable element after radially inward deformation of the tubular deformable element.

2. A coupling according to claim 1, wherein two seals are located between the inner and outer members at positions spaced apart along the length of the inner tubular member and on opposite sides of the inlet, the seals closing ends of the annular chamber.

3. A coupling according to claim 2, wherein the seals comprise O-rings located between the inner and outer members.

4. A coupling according to claim 2, wherein the seal are formed by explosive welding.

5. A coupling according to claim 2, wherein the seals are formed by soldered or brazed joints.

6. A coupling according to claim 2, comprising at least two pairs of seals, the seals of each pair defining a respective chamber communicating with a respective pressurised fluid inlet.

7. A coupling according to claim 1, comprising means for releasing pressurised fluid from the chamber if pressure within the chamber exceeds a predetermined limit.

8. A coupling according to claim 7, wherein the pressurised fluid release means comprises a burst disc incorporated in the outer member.

9. A coupling according to claim 7, wherein the pressurised fluid release means comprises a seal between the inner and outer members which fails after a predetermined radial compression of the inner member.

10. A coupling according to claim 1, wherein the inner member defines a radially inwards extending member to limit the depth of insertion of the tubular deformable element into the socket.

11. A coupling according to claim 1, wherein the outer member is deformable and the inlet comprises means for engaging an opening in a support clamp within which the coupling may be received, the support clamp resisting radially outwards expansion of the outer member resulting from pressurisation of the chamber which communicates with the inlet.

12. A coupling according to claim 11, wherein the inlet comprises a tube extending through and radially outwards from the deformable outer member, the tube being adapted to be inserted into the clamp opening.

13. A coupling according to claim 12, wherein the clamp opening supports a seal with which the inlet tube engages to prevent pressurisation fluid penetrating between the clamp and the deformable outer member.

14. A coupling according to claim 1, wherein the chamber is filled with a fluid which hardens after pressurisation of the chamber.

15. A coupling according to claim 1, comprising means for preventing loss of pressurisation fluid from the chamber.

16. A coupling according to claim 15, wherein the preventing means comprise a non-return valve in the inlet.

17. A coupling according to claim 1, wherein the inner member is a copper tube.

18. A coupling according to claim 1, wherein the surface formations define circumferentially extending teeth.

19. A coupling according to claim 1, wherein the surface formations define circumferentially extending rectangular grooves.

20. A coupling according to claim 1, wherein the surface formations define openings extending radially through the insert.

21. A coupling according to claim 1, wherein the insert is attached to a flange.

22. A pipe coupling according to claim 1, wherein the end of the insert which is introduced first into the element is outwardly flared, and the length of the insert is less than the length of the socket, such that the portion of the tubular deformable element which is deformed radially inwards extends axially on both sides of the flared end of the insert.

23. A pipe coupling according to claim 1, wherein one end of the tubular insert in use is inserted inside the end of one of two tubular elements to be interconnected by the coupling and the other end of which in use is inserted inside the end of the other of the two elements.

24. A pipe coupling according to claim 23, wherein the tubular insert is ribbed to define an expansion joint to enable axial expansion and contraction of the tubular insert.

25. A pipe coupling according to claim 23, wherein the tubular insert is ribbed to limit the depth of insertion of the insert into the tubular elements.

26. A pipe coupling according to claim 1, wherein a reinforcing member is positioned inside the inner tubular member such that the reinforcing member is pressed radially against the element by pressurisation of the chamber.

27. A pipe coupling according to claim 26, wherein the reinforcing element is a metal coil.

28. A method for connecting a tubular deformable element to a coupling comprising a radially compressible tubular member defining a socket into which the tubular deformable element is inserted, wherein a sealed chamber is defined around the tubular member, and pressurised fluid is introduced into the chamber, the pressure of the introduced fluid being sufficient to deform the tubular member radially inwards to grip the tubular deformable element, wherein the coupling comprises a tubular insert which is inserted into the end of the tubular deformable element, the tubular insert is arranged to limit the radially inwards deformation of the tubular deformable element, and the tubular insert is provided with surface formations to grip the tubular deformable element after radially inward deformation of the tubular deformable element.

29. A method according to claim 28, wherein the sealed chamber is defined by mounting the tubular member in an outer member such that the chamber is defined between the tubular member and the outer member, the outer member being such that it is not substantially expanded by introduction of the pressurised fluid into the chamber.

30. A method according to claim 28, wherein the sealed chamber is defined by mounting the tubular member in an outer member such that the chamber is defined between the tubular member and the outer member, the outer member being such that if unsupported it would be expanded by introduction of the pressurised fluid into the chamber, and supporting the coupling in a clamp arranged around the outer member such that expansion of the outer member is limited by contact with the clamp after introduction of the pressurised fluid into the chamber.

31. A method according to claim 28, wherein a reinforcing member is positioned within the element during pressurisation of the chamber to prevent collapse of the element.

32. A method according to claim 31, wherein the reinforcing member comprises a removable body which is removed after pressurisation of the coupling.

33. A method according to claim 31, wherein the removable body comprises two interengageable wedge-shaped elements.

* * * * *